United States Patent
Ichikawa

(10) Patent No.: US 9,634,733 B2
(45) Date of Patent: Apr. 25, 2017

(54) CONTACTLESS POWER FEEDING SYSTEM, VEHICLE, POWER FEEDING FACILITY AND METHOD OF CONTROLLING CONTACTLESS POWER FEEDING SYSTEM

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 771 days.

(21) Appl. No.: 13/992,093

(22) PCT Filed: Dec. 24, 2010

(86) PCT No.: PCT/JP2010/073323
§ 371 (c)(1),
(2), (4) Date: Jun. 6, 2013

(87) PCT Pub. No.: WO2012/086051
PCT Pub. Date: Jun. 28, 2012

(65) Prior Publication Data
US 2013/0257370 A1      Oct. 3, 2013

(51) Int. Cl.
*H04B 5/00* (2006.01)
*B60L 11/18* (2006.01)
(Continued)

(52) U.S. Cl.
CPC .............. *H04B 5/0037* (2013.01); *B60L 7/14* (2013.01); *B60L 11/182* (2013.01); *B60L 11/1803* (2013.01); *B60L 11/1824* (2013.01); *B60L 11/1833* (2013.01); *H02J 5/005* (2013.01); *H02J 50/12* (2016.02); *H02J 50/50* (2016.02); *H02J 50/80* (2016.02); *H02J 50/90* (2016.02);
(Continued)

(58) Field of Classification Search
CPC . H02J 5/005; H02J 7/025; H02J 17/00; H04B 5/0025–5/0093; B60L 11/182; B60L 11/1829–11/1831; Y02T 90/122
See application file for complete search history.

(56) References Cited

U.S. PATENT DOCUMENTS 7,741,734 B2    6/2010  Joannopoulos et al.
8,248,027 B2 *  8/2012  Sakoda .................. H02J 5/005
                                                      307/104

(Continued)

FOREIGN PATENT DOCUMENTS

AU    2006269374 B2    1/2007
AU    2006269374 C1    1/2007
(Continued)

*Primary Examiner* — Hal Kaplan
*Assistant Examiner* — Elim Ortiz
(74) *Attorney, Agent, or Firm* — Oliff PLC

(57) ABSTRACT

When an impedance adjustment process of a resonant system is started, a power feeding facility outputs power for adjustment. Then, an ECU of the power feeding facility adjusts an impedance matching box provided in the power feeding facility, and when the adjustment is completed, transmits an instruction for adjustment in a vehicle to the vehicle. When the vehicle receives the adjustment instruction from the power feeding facility, the vehicle adjusts an impedance matching box provided in the vehicle. That is, in this contactless power feeding system, the impedance adjustment in the power feeding facility is performed first, and the adjustment in the vehicle is performed thereafter.

9 Claims, 9 Drawing Sheets

(51) Int. Cl.
*H02J 5/00* (2016.01)
*B60L 7/14* (2006.01)
*H02J 50/12* (2016.01)
*H02J 50/90* (2016.01)
*H02J 50/80* (2016.01)
*H02J 50/50* (2016.01)

(52) U.S. Cl.
CPC ....... *B60L 2210/10* (2013.01); *B60L 2210/30* (2013.01); *B60L 2210/40* (2013.01); *B60L 2260/44* (2013.01); *Y02T 10/7005* (2013.01); *Y02T 10/7072* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

| | | | |
|---|---|---|---|
| 8,432,066 B2 * | 4/2013 | Takada | G06F 17/5063 307/104 |
| 2007/0222542 A1 | 9/2007 | Joannopoulos et al. | |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0259109 A1 | 10/2010 | Sato | |
| 2010/0264745 A1 | 10/2010 | Karalis et al. | |
| 2011/0049995 A1 * | 3/2011 | Hashiguchi | H02J 5/005 307/104 |
| 2011/0095618 A1 * | 4/2011 | Schatz | H03H 7/40 307/104 |
| 2011/0169337 A1 * | 7/2011 | Kozakai | H02J 5/005 307/104 |
| 2011/0241440 A1 | 10/2011 | Sakoda et al. | |
| 2011/0270462 A1 | 11/2011 | Amano et al. | |
| 2012/0098348 A1 | 4/2012 | Inoue et al. | |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| EP | 2 571 140 A1 | 3/2013 |
| IN | 735/DELNP/2008 | 5/2008 |
| IN | 6195/DELNP/2009 | 7/2010 |
| JP | A-2009-501510 | 1/2009 |
| JP | A-2010-119246 | 5/2010 |
| JP | A-2010-141976 | 6/2010 |
| JP | A-2010-141977 | 6/2010 |
| JP | A-2010-252/197 | 11/2010 |
| JP | A-2010-268531 | 11/2010 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | WO 2010/067763 A1 | 6/2010 |
| WO | 2010/119577 A1 | 10/2010 |
| WO | WO 2010/144885 A1 | 12/2010 |
| WO | WO 2011-142417 A1 | 11/2011 |
| WO | 2012/014482 A1 | 2/2012 |
| WO | 2012/014485 A2 | 2/2012 |
| WO | WO 2012/073349 A1 | 6/2012 |

* cited by examiner

CONTACTLESS POWER FEEDING SYSTEM, VEHICLE, POWER FEEDING FACILITY AND METHOD OF CONTROLLING CONTACTLESS POWER FEEDING SYSTEM

TECHNICAL FIELD

The present invention relates to a contactless power feeding system, a vehicle, a power feeding facility and a method of controlling the contactless power feeding system, and more particularly to contactless power feeding in which a power transmission unit and a power reception unit resonate with each other through an electromagnetic field to feed power in a contactless manner.

BACKGROUND ART

Electrically powered vehicles such as electric vehicles and hybrid vehicles have attracted a lot of attention as environmentally friendly vehicles. These vehicles incorporate a motor for generating a driving force for running, and a rechargeable power storage device for storing power supplied to the motor. A hybrid vehicle refers to a vehicle incorporating a motor as well as an internal combustion engine as a power source, a vehicle incorporating a power storage device as well as a fuel cell as a direct-current power supply for driving the vehicle, and the like.

As with an electric vehicle, a hybrid vehicle having a vehicle-mounted power storage device that can be charged from a power supply outside of the vehicle is known. For example, a so-called "plug-in hybrid vehicle" is known in which a power storage device can be charged from a power supply at an ordinary household by connecting a power supply outlet provided at the house to a charging inlet provided on the vehicle by a charging cable.

Wireless power transmission without using a power cord or a power transmission cable has been receiving attention in recent years as a power transmission method. Power transmission using electromagnetic induction, power transmission using a microwave, and power transmission by resonance are three dominant techniques known for wireless power transmission.

Among these techniques, the resonance is a contactless power transmission technique for causing a pair of resonators (e.g., a pair of coils) to resonate with each other in an electromagnetic field (near field) to transmit power through the electromagnetic field, and can transmit a large amount of power of several kW across a relatively long distance (e.g., several meters).

Japanese Patent Laying-Open No. 2010-141976 (Patent Document 1) discloses a contactless power transmitting apparatus for transmitting power in a contactless manner to a vehicle by resonance. This contactless power transmitting apparatus includes an alternating-current power supply, a primary coil connected to the alternating-current power supply, a primary-side resonant coil, a secondary-side resonant coil, and a secondary coil connected to a load (secondary battery), and further includes a variable impedance circuit arranged between the alternating-current power supply and the primary coil. The primary coil, primary-side resonant coil, secondary-side resonant coil, secondary coil and load constitute a resonant system. An impedance of the variable impedance circuit is adjusted to match an input impedance of the resonant system at a resonant frequency to an impedance of a portion closer to the alternating-current power supply than the primary coil.

A contactless power transmitting apparatus described in Japanese Patent Laying-Open No. 2010-141977 (Patent Document 2) includes an alternating-current power supply, a primary coil connected to the alternating-current power supply, a primary-side resonant coil, a secondary-side resonant coil, and a secondary coil connected to a load (secondary battery), and further includes a variable impedance circuit arranged between the secondary coil and the load. The primary coil, primary-side resonant coil, secondary-side resonant coil, secondary coil, load and variable impedance circuit constitute a resonant system. The alternating-current power supply outputs an alternating voltage at a frequency equal to a resonant frequency of the resonant system. An impedance of the variable impedance circuit is adjusted to suppress variation in input impedance of the resonant system.

According to these contactless power transmitting apparatuses, electric power can be efficiently supplied from the alternating-current power supply to the load without changing the frequency of the alternating-current power supply, even if the distance between the resonant coils or the load receiving the power is varied (see Patent Documents 1 and 2).

CITATION LIST

Patent Documents

PTD 1: Japanese Patent Laying-Open No. 2010-141976
PTD 2: Japanese Patent Laying-Open No. 2010-141977
PTD 3: Japanese Patent Laying-Open No. 2010-119246

SUMMARY OF INVENTION

Technical Problem

If a position mismatch of a secondary-side resonant coil occurs relative to a primary-side resonant coil, the distance between the coils varies to vary the impedance of a resonant system, resulting in lower efficiency of power transmission from a power feeding facility to a vehicle. In the contactless power transmitting apparatus disclosed in Japanese Patent Laying-Open No. 2010-141976, the variable impedance circuit is provided on the power feeding facility side (primary side) to perform impedance matching between the resonant system and the power supply device. In the contactless power transmitting apparatus disclosed in Japanese Patent Laying-Open No. 2010-141977, on the other hand, the variable impedance circuit is provided on the power receiving apparatus side (secondary side) to perform impedance matching.

In the contactless power transmitting apparatuses described above, however, a variable impedance circuit is provided on only one of the primary side or the secondary side, resulting in a limited range of impedance adjustment. It is then conceivable that a variable impedance circuit may be provided on both the primary side and the secondary side. A method of adjusting impedance in such case is not specifically described in the above publications, however.

An object of the present invention, therefore, is to provide a method of adjusting impedance in a contactless power feeding system including a variable impedance circuit on both a primary side and a secondary side.

Solution to Problem

According to the present invention, a contactless power feeding system includes a power feeding facility, and a power receiving apparatus for receiving electric power in a contactless manner from the power feeding facility. The power feeding facility includes a power supply device, a power transmission unit, a first variable impedance device, and a first control device. The power supply device generates electric power having a prescribed frequency. The power transmission unit receives the power from the power supply device, and resonates with the power receiving apparatus through an electromagnetic field to transmit the power in a contactless manner to the power receiving apparatus. The first variable impedance device is provided between the power supply device and the power transmission unit. The first control device adjusts the first variable impedance device. The power receiving apparatus includes a power reception unit, a load, a second variable impedance device, and a second control device. The power reception unit resonates with the power transmission unit through the electromagnetic field to receive the power in a contactless manner from the power transmission unit. The load receives the power received by the power reception unit. The second variable impedance device is provided between the power reception unit and the load. The second control device adjusts the second variable impedance device. The first control device adjusts the first variable impedance device prior to adjustment of the second variable impedance device in the power receiving apparatus. The second control device adjusts the second variable impedance device after the adjustment of the first variable impedance device by the first control device.

Preferably, the power feeding facility further includes a first communication device. The power receiving apparatus further includes a second communication device capable of establishing communication with the first communication device. The second communication device transmits information on the power receiving apparatus to the power feeding facility. The first control device adjusts the first variable impedance device by using the information on the power receiving apparatus received by the first communication device. The first communication device transmits information on the power feeding facility to the power receiving apparatus. The second control device adjusts the second variable impedance device by using the information on the power feeding facility received by the second communication device.

Further preferably, the first control device adjusts the first variable impedance device based on a position mismatch amount of the power reception unit relative to the power transmission unit, which is estimated based on the information on the power receiving apparatus. The first communication device transmits the estimated position mismatch amount to the power receiving apparatus. The second control device adjusts the second variable impedance device based on the position mismatch amount received by the second communication device.

Preferably, the power receiving apparatus further includes a resistor element and a switching device. The resistor element is electrically connected between a pair of power lines provided between the power reception unit and the second variable impedance device during the adjustment of the first and second variable impedance devices. The switching device electrically connects the resistor element between the pair of power lines and electrically disconnects the second variable impedance device from the power reception unit during the adjustment of the first and second variable impedance devices.

Preferably, the power receiving apparatus further includes a rectifier, a resistor element, and a switching device. The rectifier is provided between the second variable impedance device and the load, for rectifying the power received by the power reception unit. The resistor element is electrically connected between a pair of power lines provided between the rectifier and the load during the adjustment of the first and second variable impedance devices. The switching device electrically connects the resistor element between the pair of power lines and electrically disconnects the load from the rectifier during the adjustment of the first and second variable impedance devices.

Preferably, the power transmission unit includes a primary self-resonant coil. The power reception unit includes a secondary self-resonant coil. The primary self-resonant coil receives the power from the power supply device to generate the electromagnetic field. The secondary self-resonant coil resonates with the primary self-resonant coil through the electromagnetic field to receive the power from the primary self-resonant coil.

Preferably, the power transmission unit includes a primary coil and a primary self-resonant coil. The power reception unit includes a secondary self-resonant coil and a secondary coil. The primary coil receives the power from the power supply device. The primary self-resonant coil receives the power from the primary coil by electromagnetic induction to generate the electromagnetic field. The power reception unit includes a secondary self-resonant coil and a secondary coil. The secondary self-resonant coil resonates with the primary self-resonant coil through the electromagnetic field to receive the power from the primary self-resonant coil. The secondary coil extracts the power received by the secondary self-resonant coil by electromagnetic induction to output the power.

Preferably, the power receiving apparatus is mounted on a vehicle.

According to the present invention, a vehicle capable of receiving electric power in a contactless manner from a power feeding facility is provided. The power feeding facility includes a first variable impedance device. The first variable impedance device is provided between a power supply device and a power transmission unit. The vehicle includes a power reception unit, a load, a second variable impedance device, and a control device. The power reception unit resonates with the power transmission unit through an electromagnetic field to receive the power in a contactless manner from the power transmission unit. The load receives the power received by the power reception unit. The second variable impedance device is provided between the power reception unit and the load. The control device adjusts the second variable impedance device. The control device adjusts the second variable impedance device after adjustment of the first variable impedance device in the power feeding facility.

Preferably, the vehicle further includes a communication device capable of establishing communication with the power feeding facility. The control device adjusts the second variable impedance device by using information on the power feeding facility received by the communication device.

Further preferably, the control device adjusts the second variable impedance device based on a position mismatch amount of the power reception unit relative to the power transmission unit.

Preferably, the vehicle further includes a resistor element and a switching device. The resistor element is electrically connected between a pair of power lines provided between the power reception unit and the second variable impedance device during the adjustment of the first and second variable impedance devices. The switching device electrically connects the resistor element between the pair of power lines and electrically disconnects the second variable impedance device from the power reception unit during the adjustment of the first and second variable impedance devices.

Preferably, the vehicle further includes a rectifier, a resistor element, and a switching device. The rectifier is provided between the second variable impedance device and the load, for rectifying the power received by the power reception unit. The resistor element is electrically connected between a pair of power lines provided between the rectifier and the load during the adjustment of the first and second variable impedance devices. The switching device electrically connects the resistor element between the pair of power lines and electrically disconnects the load from the rectifier during the adjustment of the first and second variable impedance devices.

Preferably, the power transmission unit includes a primary self-resonant coil. The power reception unit includes a secondary self-resonant coil. The primary self-resonant coil receives the power from the power supply device to generate the electromagnetic field. The secondary self-resonant coil resonates with the primary self-resonant coil through the electromagnetic field to receive the power from the primary self-resonant coil.

Preferably, the power transmission unit includes a primary coil and a primary self-resonant coil. The power reception unit includes a secondary self-resonant coil and a secondary coil. The primary coil receives the power from the power supply device. The primary self-resonant coil receives the power from the primary coil by electromagnetic induction to generate the electromagnetic field. The secondary self-resonant coil resonates with the primary self-resonant coil through the electromagnetic field to receive the power from the primary self-resonant coil. The secondary coil extracts the power received by the secondary self-resonant coil by electromagnetic induction to output the power.

According to the present invention, a power feeding facility capable of transmitting electric power in a contactless manner to a power receiving apparatus is provided. The power receiving apparatus includes a first variable impedance device. The first variable impedance device is provided between a power reception unit and a load for receiving the power received by the power reception unit. The power feeding facility includes a power supply device, a power transmission unit, a second variable impedance device, and a control device. The power supply device generates electric power having a prescribed frequency. The power transmission unit receives the power from the power supply device, and resonates with the power receiving apparatus through an electromagnetic field to transmit the power in a contactless manner to the power receiving apparatus. The second variable impedance device is provided between the power supply device and the power transmission unit. The control device adjusts the second variable impedance device. The control device adjusts the second variable impedance device prior to adjustment of the first variable impedance device in the power receiving apparatus.

Preferably, the power feeding facility further includes a communication device capable of establishing communication with the power receiving apparatus. The control device adjusts the second variable impedance device by using information on the power receiving apparatus received by the communication device.

Further preferably, the control device adjusts the second variable impedance device based on a position mismatch amount of the power reception unit relative to the power transmission unit, which is estimated based on the information on the power receiving apparatus.

Preferably, the power transmission unit includes a primary self-resonant coil. The power reception unit includes a secondary self-resonant coil. The primary self-resonant coil receives the power from the power supply device to generate the electromagnetic field. The secondary self-resonant coil resonates with the primary self-resonant coil through the electromagnetic field to receive the power from the primary self-resonant coil.

Preferably, the power transmission unit includes a primary coil and a primary self-resonant coil. The power reception unit includes a secondary self-resonant coil and a secondary coil. The primary coil receives the power from the power supply device. The primary self-resonant coil receives the power from the primary coil by electromagnetic induction to generate the electromagnetic field. The secondary self-resonant coil resonates with the primary self-resonant coil through the electromagnetic field to receive the power from the primary self-resonant coil. The secondary coil extracts the power received by the secondary self-resonant coil by electromagnetic induction to output the power.

According to the present invention, a method of controlling a contactless power feeding system in which electric power is fed in a contactless manner from a power feeding facility to a power receiving apparatus is provided. The power feeding facility includes a power supply device, a power transmission unit, and a first variable impedance device. The power supply device generates electric power having a prescribed frequency. The power transmission unit receives the power from the power supply device, and resonates with the power receiving apparatus through an electromagnetic field to transmit the power in a contactless manner to the power receiving apparatus. The first variable impedance device is provided between the power supply device and the power transmission unit. The power receiving apparatus includes a power reception unit, a load, and a second variable impedance device. The power reception unit resonates with the power transmission unit through the electromagnetic field to receive the power in a contactless manner from the power transmission unit. The load receives the power received by the power reception unit. The second variable impedance device is provided between the power reception unit and the load. The method includes the steps of adjusting the first variable impedance device prior to adjusting the second variable impedance device, and adjusting the second variable impedance device after adjusting the first variable impedance device.

Advantageous Effects of Invention

In the present invention, the power feeding facility and the power receiving apparatus include the first variable impedance device and the second variable impedance device, respectively. Thus, a wide range of impedance adjustment is obtained as compared to when a variable impedance device is provided in only one of the power feeding facility and the power receiving apparatus. In addition, the first variable impedance device in the power feeding facility is adjusted prior to adjustment of the second variable impedance device in the power receiving apparatus. After the adjustment of the first variable impedance device by the first control device, the second variable impedance device is adjusted. Thus, the reflected power is suppressed in the power feeding facility.

According to the present invention, therefore, the wide range of impedance adjustment can improve power transmission efficiency, and the suppression of reflected power in the power feeding facility can prevent damage to the power supply device.

DESCRIPTION OF EMBODIMENTS

Figure 1:
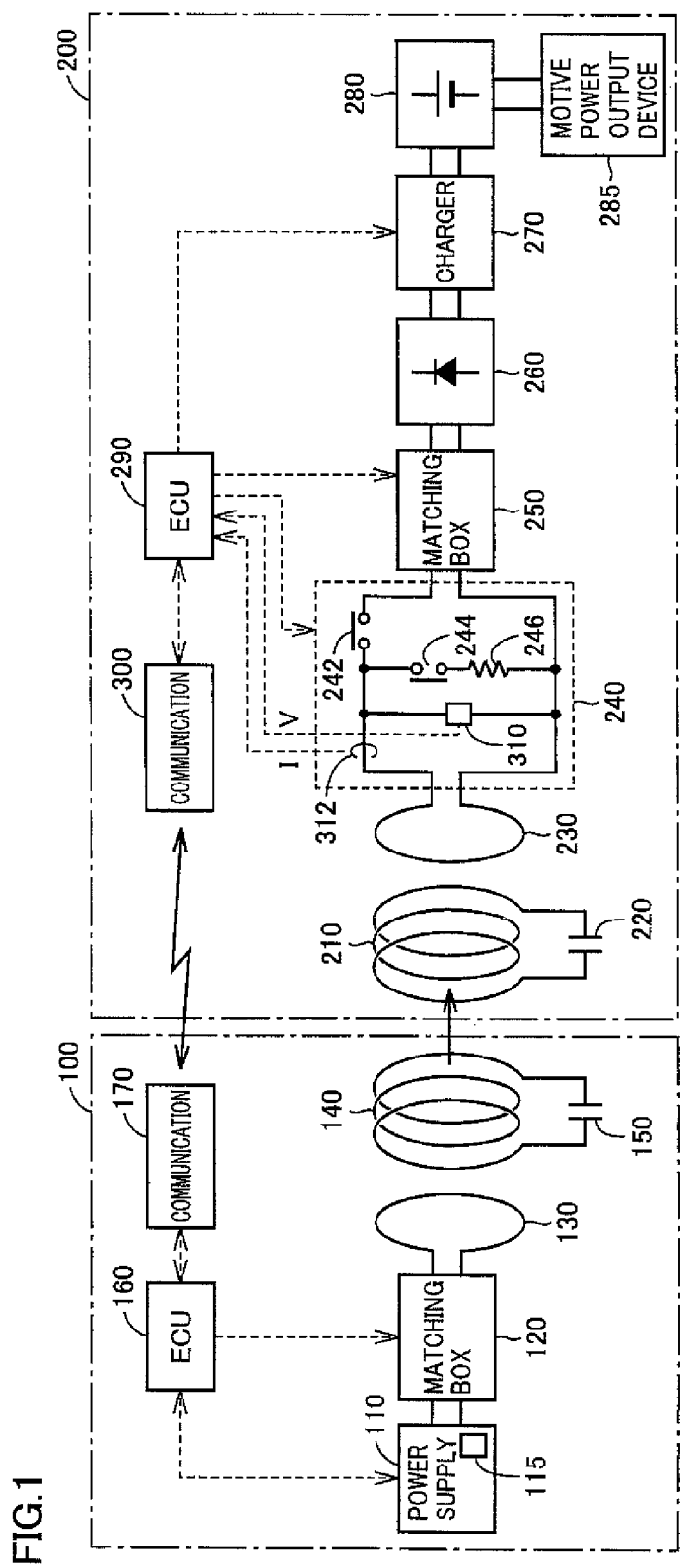
FIG. 1 is an overall configuration diagram of a contactless power feeding system according to a first embodiment of the present invention.

The embodiments of the present invention will be hereinafter described in detail with reference to the drawings, in which the same or corresponding components are designated by the same reference characters, and description thereof will not be repeated.

First Embodiment

FIG. 1 is an overall configuration diagram of a contactless power feeding system according to a first embodiment of the present invention. Referring to FIG. 1, this contactless power feeding system includes a power feeding facility 100 and a vehicle 200.

Power feeding facility 100 includes a power supply device 110, a power sensor 115, an impedance matching box 120, a primary coil 130, a primary self-resonant coil 140, a capacitor 150, an electronic control unit (hereinafter referred to as "ECU") 160, and a communication device 170.

Power supply device 110 generates electric power having a prescribed frequency. As an example, power supply device 110 receives electric power from a not-shown system power supply, and generates electric power having a prescribed frequency within a range from 1 MHz to a little more than 10 MHz. Power supply device 110 controls the generation and interruption of power and output power in accordance with instructions received from ECU 160.

Power sensor 115 detects traveling wave power and reflected power in power supply device 110, and outputs the detected values to ECU 160. The traveling wave power refers to power that is output from power supply device 110. The reflected power refers to power that is output from power supply device 110 and reflected back to power supply device 110. A variety of known sensors capable of detecting the traveling wave power and reflected power in the power supply device can be used as power sensor 115.

Impedance matching box 120 is provided between power supply device 110 and primary coil 130, and configured to be able to vary the inner impedance. Impedance matching box 120 varies the impedance in accordance with an instruction received from ECU 160, to match an input impedance of a resonant system including primary coil 130, primary self-resonant coil 140 and capacitor 150, and a secondary self-resonant coil 210, a capacitor 220 and a secondary coil 230 (described later) of vehicle 200 to an output impedance of power supply device 110.

Figure 2:
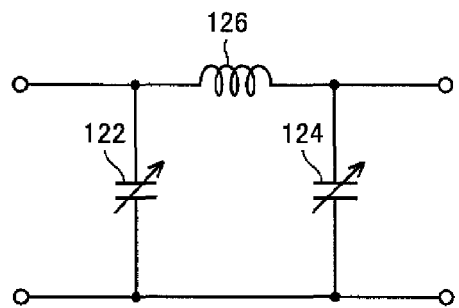
FIG. 2 is a circuit diagram illustrating an example of a circuit configuration of an impedance matching box.

FIG. 2 is a circuit diagram illustrating an example of a circuit configuration of impedance matching box 120. Referring to FIG. 2, impedance matching box 120 includes variable capacitors 122, 124, and a coil 126. Variable capacitor 122 is connected in parallel to power supply device 110 (FIG. 1). Variable capacitor 124 is connected in parallel to primary coil 130 (FIG. 1). Coil 126 is connected on one of a pair of power lines provided between power supply device 110 and primary coil 130, between connection nodes of variable capacitors 122 and 124.

In impedance matching box 120, the impedance is varied by varying the capacity of at least one of variable capacitors 122 and 124 in accordance with an instruction received from ECU 160 (FIG. 1). Thus, impedance matching box 120 matches the input impedance of the resonant system to the output impedance of power supply device 110 in accordance with the instruction received from ECU 160.

Although not specifically shown, coil 126 may be formed of a variable coil, and the impedance may be varied by varying the inductance of the variable coil.

Referring again to FIG. 1, primary coil 130 is provided substantially coaxially with primary self-resonant coil 140 at a prescribed distance from primary self-resonant coil 140. Primary coil 130 is magnetically coupled to primary self-resonant coil 140 by electromagnetic induction, and supplies high-frequency power supplied from power supply device 110 to primary self-resonant coil 140 by electromagnetic induction.

Primary self-resonant coil 140 receives the power from primary coil 130 by electromagnetic induction, and resonates with secondary self-resonant coil 210 (described later) mounted on vehicle 200 through an electromagnetic field to transmit the power to secondary self-resonant coil 210. Primary self-resonant coil 140 is provided with capacitor 150. Capacitor 150 is connected between opposing ends of primary self-resonant coil 140, for example. The coil diameter and the number of turns of primary self-resonant coil 140 and the capacity of capacitor 150 are appropriately set so as to increase a Q value (e.g., Q>100) and a degree of coupling κ.

It is noted that primary coil 130 is provided to facilitate the power feeding from power supply device 110 to primary self-resonant coil 140. Power supply device 110 may be directly connected to primary self-resonant coil 140 without providing primary coil 130. Alternatively, capacitor 150 may not be provided by utilizing a stray capacitance of primary self-resonant coil 140.

During power feeding from power feeding facility 100 to vehicle 200, ECU 160 receives the detected values of reflected power and traveling wave power from power sensor 115, and receives a receiving state of vehicle 200 received via communication device 170. The receiving state of vehicle 200 includes information such as a receiving voltage, a receiving current and receiving power of vehicle 200. ECU 160 then performs a prescribed process by software processing of executing a prestored program with a CPU (Central Processing Unit) and/or by hardware processing with a dedicated electronic circuit.

Specifically, ECU 160 controls the operation of power supply device 110. In addition, ECU 160 adjusts the impedance of impedance matching box 120 prior to charging of a power storage device 280 (described later) in vehicle 200 by power feeding facility 100. When the adjustment of impedance matching box 120 is completed, ECU 160 subsequently transmits an instruction to start adjustment of an impedance matching box 250 (described later) in vehicle 200 to vehicle 200 via communication device 170. ECU 160 also transmits information necessary for the adjustment of impedance matching box 250 in vehicle 200, such as an adjusted value of impedance matching box 120 and the detected value of reflected power, to vehicle 200 via communication device 170.

ECU 160 estimates a position mismatch amount of secondary self-resonant coil 210 relative to primary self-resonant coil 140 (hereinafter simply referred to as "position mismatch amount"), and adjusts the impedance of impedance matching box 120 based on the estimated position mismatch amount. As a method of estimating the position mismatch amount, ECU 160 estimates the position mismatch amount based on the receiving state of vehicle 200 and the reflected power to power supply device 110. Primary self-resonant coil 140 and secondary self-resonant coil 210 are provided such that their central axes are parallel to each other, and an offset amount of the central axis of secondary self-resonant coil 210 relative to the central axis of primary self-resonant coil 140 is referred to as the "position mismatch amount." Such processing performed by ECU 160 will be described later in detail.

Communication device 170 serves as a communication interface for establishing communication with vehicle 200. Communication device 170 transmits an instruction to start a series of processes including the estimation of the position mismatch amount and the impedance adjustment (hereinafter also referred to simply as "adjustment process"), an instruction to start adjustment in vehicle 200, information on power feeding facility 100 such as the adjusted value of impedance matching box 120 and the reflected power, and an instruction to start practical power feeding for charging power storage device 280 to vehicle 200. In addition, communication device 170 receives a receiving state of vehicle 200, a state of charge (hereinafter also referred to as "SOC") of power storage device 280, and a signal indicating the completion of adjustment in vehicle 200 from vehicle 200.

Vehicle 200 includes secondary self-resonant coil 210, capacitor 220, secondary coil 230, a switching device 240, impedance matching box 250, a rectifier 260, a charger 270, power storage device 280, and a motive power output device 285. Vehicle 200 further includes an ECU 290, a communication device 300, a voltage sensor 310, and a current sensor 312.

Secondary self-resonant coil 210 resonates with primary self-resonant coil 140 of power feeding facility 100 through an electromagnetic field to receive power from primary self-resonant coil 140. Secondary self-resonant coil 210 is provided with capacitor 220. Capacitor 220 is connected between opposing ends of secondary self-resonant coil 210, for example. The coil diameter and the number of turns of secondary self-resonant coil 210 and the capacity of capacitor 220 are appropriately set so as to increase a Q value (e.g., Q>100) and a degree of coupling κ.

Secondary coil 230 is provided substantially coaxially with secondary self-resonant coil 210 at a prescribed distance from secondary self-resonant coil 210. Secondary coil 230 can be magnetically coupled to secondary self-resonant coil 210 by electromagnetic induction, and extracts the power received by secondary self-resonant coil 210 by electromagnetic induction and outputs the power to switching device 240.

It is noted that secondary coil 230 is provided to facilitate the extraction of power from secondary self-resonant coil 210. Switching device 240 may be directly connected to secondary self-resonant coil 210 without providing secondary coil 230. Alternatively, capacitor 220 may not be provided by utilizing a stray capacitance of secondary self-resonant coil 210.

Switching device 240 is provided between secondary coil 230 and impedance matching box 250. Switching device 240 includes relays 242, 244, and a resistor element 246. Relay 242 is provided on a power line between secondary coil 230 and impedance matching box 250. Relay 244 and resistor element 246 are connected in series between a pair of power lines between secondary coil 230 and impedance matching box 250, closer to secondary coil 230 than relay 242.

During charging of power storage device 280 by power feeding facility 100, relays 242 and 244 are turned on and off, respectively. During the adjustment of impedance matching box 120 in power feeding facility 100 in the adjustment process, on the other hand, relays 242 and 244 are turned off and on, respectively. Thus, a load of vehicle 200 whose impedance varies with the SOC of power storage device 280 is disconnected from the resonant system, thus allowing the impedance adjustment to be stably performed in power feeding facility 100. When the impedance adjustment in power feeding facility 100 is completed and an instruction to start adjustment in vehicle 200 is received from power feeding facility 100, relays 242 and 244 are turned on and off, respectively. Thus, impedance matching box 250 is electrically connected to the resonant system.

Impedance matching box 250 is provided between switching device 240 and rectifier 260, and configured to be able to vary the inner impedance. Impedance matching box 250 varies the impedance in accordance with an instruction received from ECU 290, to match an input impedance of the resonant system to an output impedance of power supply device 110. It is noted that impedance matching box 250 has the same configuration as that of impedance matching box 120 of power feeding facility 100 shown in FIG. 2.

Rectifier 260 rectifies electric power (alternating current) output from secondary coil 230. Charger 270 converts the voltage of direct-current power output from rectifier 260 to a charging voltage of power storage device 280, and outputs the voltage to power storage device 280. Power storage device 280 is a rechargeable direct-current power supply, and formed of a secondary battery such as a lithium-ion battery or a nickel-metal hydride battery. Power storage device 280 stores the power received from charger 270, and also stores regenerative power generated by motive power output device 285. Power storage device 280 then supplies the stored power to motive power output device 285. A capacitor having a large capacity can be employed as power storage device 280.

Motive power output device 285 generates a driving force for running of vehicle 200 by using the power stored in power storage device 280. Although not specifically shown, motive power output device 285 includes an inverter for receiving power from power storage device 280, a motor driven by the inverter, and drive wheels driven by the motor, for example. Motive power output device 285 may include a power generator for charging power storage device 280, and an engine capable of driving the power generator.

Voltage sensor 310 detects a voltage V output from secondary coil 230, and outputs the detected value to ECU 290. Current sensor 312 detects a current I output from secondary coil 230, and outputs the detected value to ECU 290.

ECU 290 receives the detected values of voltage V and current I from voltage sensor 310 and current sensor 312, respectively. ECU 290 also receives the various instructions and information transmitted from power feeding facility 100 via communication device 300. ECU 290 then performs a prescribed process by software processing of executing a prestored program with a CPU (Central Processing Unit) and/or by hardware processing with a dedicated electronic circuit.

Specifically, ECU 290 adjusts an impedance of impedance matching box 250 in accordance with an instruction to start adjustment received from power feeding facility 100. When the adjustment of impedance matching box 250 is completed, ECU 290 charges power storage device 280 by controlling charger 270. The process performed by ECU 290 will be described later in detail. Communication device 300 serves as a communication interface for establishing communication with power feeding facility 100.

In this contactless power feeding system, primary self-resonant coil 140 resonates with secondary self-resonant coil 210 through an electromagnetic field to feed power from power feeding facility 100 to vehicle 200. The impedance matching box for matching an input impedance of the resonant system to an output impedance of power supply device 110 is provided in both power feeding facility 100 and vehicle 200. For impedance adjustment, first, the impedance of impedance matching box 120 in power feeding facility 100 is adjusted prior to adjustment in vehicle 200. When the adjustment of impedance matching box 120 is completed, an instruction to start adjustment of impedance matching box 250 in vehicle 200 is transmitted from power feeding facility 100 to vehicle 200, and the impedance of impedance matching box 250 in vehicle 200 is adjusted. That is, in this contactless power feeding system, the adjustment of impedance matching box 120 in power feeding facility 100 is performed first, and the adjustment of impedance matching box 250 in vehicle 200 is performed thereafter.

Figure 3:
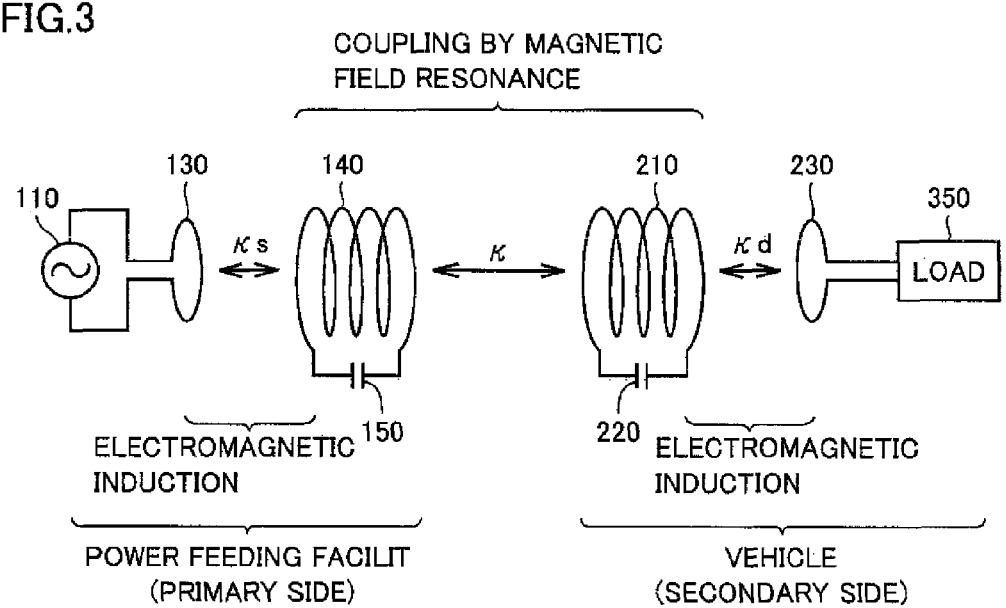
FIG. 3 is a diagram for illustrating the principle of power transmission by resonance.

FIG. 3 is a diagram for illustrating the principle of power transmission by resonance. Referring to FIG. 3, according to this resonance, as in the case where two tuning forks resonate with each other, two LC resonant coils having the same natural frequency resonate with each other in an electromagnetic field (near field), which causes electric power to be transmitted from one of the coils to the other coil through the electromagnetic field.

Specifically, primary coil 130 is connected to power supply device 110 to feed electric power having a high-frequency within a range from 1 M to a little more than 10 MHz to primary self-resonant coil 140 magnetically coupled to primary coil 130 by electromagnetic induction. Primary self-resonant coil 140 constitutes an LC resonator together with capacitor 150, and resonates through an electromagnetic field (near field) with secondary self-resonant coil 210 having the same resonance frequency as that of primary self-resonant coil 140. This causes the energy (electric power) to be transferred from primary self-resonant coil 140 through the electromagnetic field to secondary self-resonant coil 210. The energy (electric power) transferred to secondary self-resonant coil 210 is extracted by secondary coil 230 magnetically coupled to secondary self-resonant coil 210 by electromagnetic induction, and supplied to a load 350 subsequent to rectifier 260 (FIG. 1). It is noted that the power transmission by resonance is implemented when a Q value showing the intensity of resonance between primary self-resonant coil 140 and secondary self-resonant coil 210 is greater than, for example, 100.

Figure 4:
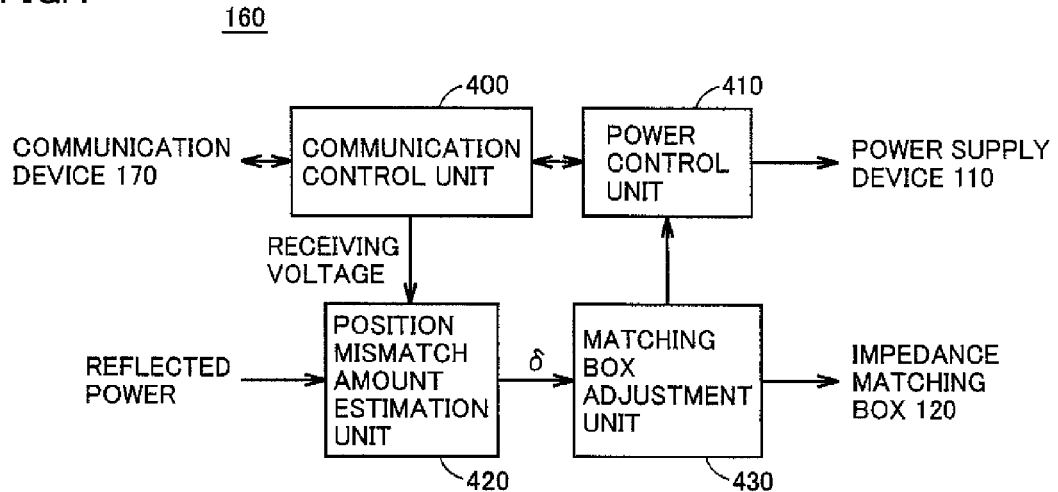
FIG. 4 is a functional block diagram of an ECU in a power feeding facility.

FIG. 4 is a functional block diagram of ECU 160 in power feeding facility 100. Referring to FIG. 4, ECU 160 includes a communication control unit 400, a power control unit 410, a position mismatch amount estimation unit 420, and a matching box adjustment unit 430.

Communication control unit 400 controls the communication between communication device 170 (FIG. 1) and vehicle 200. Specifically, communication control unit 400 transmits an instruction to start the adjustment process to vehicle 200 prior to charging of power storage device 280 in vehicle 200 by power feeding facility 100. When the adjustment of impedance matching box 120 by matching box adjustment unit 430 is completed, communication control unit 400 transmits an instruction to start adjustment in vehicle 200, and information on power feeding facility 100 necessary for the adjustment (an adjusted value of impedance matching box 120, a detected value of reflected power and the like) to vehicle 200. Communication control unit 400 also receives a receiving state of vehicle 200 from vehicle 200.

Power control unit 410 controls the power fed to vehicle 200 by controlling power supply device 110. During the adjustment process, power control unit 410 controls power supply device 110 to output power (power for adjustment) lower than that during the practical power feeding for charging power storage device 280.

Position mismatch amount estimation unit 420 estimates a position mismatch amount δ of secondary self-resonant coil 210 relative to primary self-resonant coil 140, based on the receiving voltage included in the receiving state of vehicle 200 received from vehicle 200 and the reflected power detected by power sensor 115 (FIG. 1).

Figure 5:
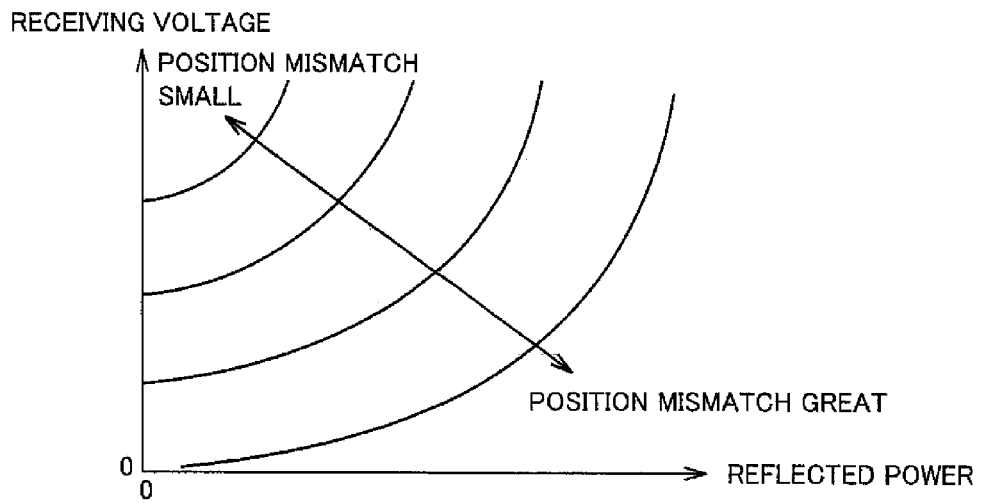
FIG. 5 illustrates relation between a receiving voltage and reflected power, and a position mismatch amount.

FIG. 5 illustrates relation between the receiving voltage and the reflected power, and the position mismatch amount δ. Referring to FIG. 5, when the position mismatch amount δ is small, the receiving voltage in vehicle 200 is high and the reflected power in power feeding facility 100 is low. When the position mismatch amount δ is great, on the other hand, the receiving voltage is low and the reflected power is high.

Accordingly, a map or the like is prepared by obtaining in advance the relation between the receiving voltage and the reflected power, and the position mismatch amount. Then, the map or the like is used to estimate the position mismatch amount δ based on the receiving voltage and reflected power detected during power transmission from power feeding facility 100 to vehicle 200.

Although not specifically shown, receiving power can be used instead of the receiving voltage. That is, when the position mismatch amount δ is small, the receiving power of vehicle 200 is high and the reflected power in power feeding facility 100 is low. When the position mismatch amount δ is great, on the other hand, the receiving power is low and the reflected power is high. Accordingly, a map or the like may be prepared by obtaining in advance the relation between the receiving power and the reflected power, and the position mismatch amount. Then, the map or the like may be used to estimate the position mismatch amount δ based on the receiving power and reflected power detected during power transmission from power feeding facility 100 to vehicle 200.

Referring again to FIG. 4, matching box adjustment unit 430 adjusts the impedance of impedance matching box 120 to match an input impedance of the resonant system to an output impedance of power supply device 110, based on the position mismatch amount δ estimated by position mismatch amount estimation unit 420.

Figure 6:
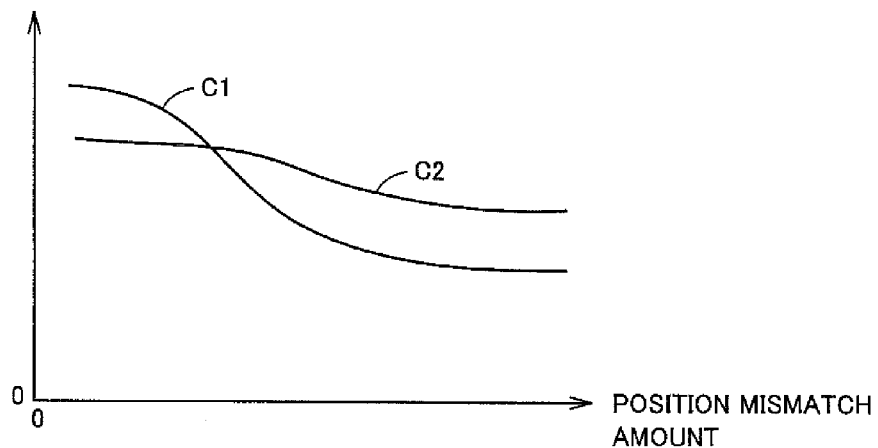
FIG. 6 illustrates an example of relation between the position mismatch amount and an adjusted value of the impedance matching box in the power feeding facility.

FIG. 6 illustrates an example of relation between the position mismatch amount δ and the adjusted value of impedance matching box 120. Referring to FIG. 6, C1 and C2 represent adjusted values of variable capacitors 122 and 124 (FIG. 2), respectively. Adjusted values C1 and C2 thus vary with the position mismatch amount δ. Accordingly, a map or the like is prepared by obtaining in advance the relation between the position mismatch amount δ and adjusted values C1 and C2. Then, the map or the like is used to determine adjusted values C1 and C2 based on the position mismatch amount δ estimated based on the receiving voltage and the reflected power.

Referring again to FIG. 4, when the adjustment of impedance matching box 120 by matching box adjustment unit 430 is completed, communication control unit 400 transmits an instruction to start adjustment in vehicle 200 to vehicle 200. Then, when a signal indicating the completion of adjustment in vehicle 200 is received, power control unit 410 controls power supply device 110 to perform practical power feeding for charging power storage device 280 in vehicle 200.

Figure 7:
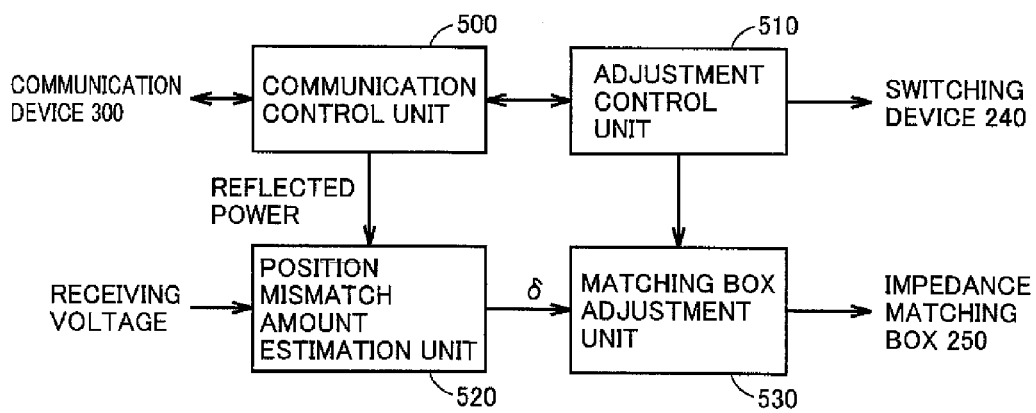
FIG. 7 is a functional block diagram of an ECU in a vehicle.

FIG. 7 is a functional block diagram of ECU 290 in vehicle 200. Referring to FIG. 7, ECU 290 includes a communication control unit 500, an adjustment control unit 510, a position mismatch amount estimation unit 520, and a matching box adjustment unit 530.

Communication control unit 500 controls the communication between communication device 300 (FIG. 1) and power feeding facility 100. Specifically, communication control unit 500 transmits a receiving state from power feeding facility 100 to power feeding facility 100. Communication control unit 500 also receives an instruction to start the adjustment process, an instruction to start adjustment in vehicle 200, and information on power feeding facility 100 necessary for the adjustment (an adjusted value of impedance matching box 120, a detected value of reflected power and the like) from power feeding facility 100.

When the instruction to start the adjustment process is received, adjustment control unit 510 turns relays 242 and 244 of switching device 240 (FIG. 1) off and on, respectively. In other words, in response to the instruction to start the adjustment process, adjustment control unit 510 disconnects the load (power storage device 280) of vehicle 200 from the resonant system and electrically connects resistor element 246 to the resonant system. Furthermore, when the instruction to start adjustment in vehicle 200 is received, adjustment control unit 510 turns relays 242 and 244 of switching device 240 on and off, respectively.

Position mismatch amount estimation unit 520 estimates the position mismatch amount δ of secondary self-resonant coil 210 relative to primary self-resonant coil 140, based on the receiving voltage detected by voltage sensor 310 (FIG. 1), and the detected value of reflected power and the adjusted value of impedance matching box 120 received form vehicle 200.

Figure 8:
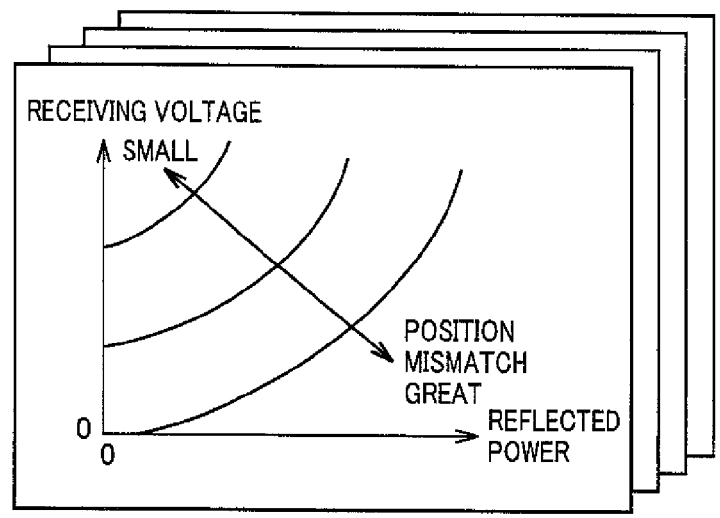
FIG. 8 is a diagram for illustrating an example of a method of estimating a position mismatch amount by a position mismatch amount estimation unit shown in FIG. 7.

FIG. 8 is a diagram for illustrating an example of a method of estimating the position mismatch amount δ by position mismatch amount estimation unit 520 shown in FIG. 7. Referring to FIG. 8, position mismatch amount estimation unit 520 estimates the position mismatch amount δ based on the relation shown in FIG. 8. In FIG. 8, the vertical axis represents receiving voltage, and the horizontal axis represents reflected power. As was described with reference to FIG. 5, when the position mismatch amount δ is small, the receiving voltage in vehicle 200 is high and the reflected power in power feeding facility 100 is low. When the position mismatch amount δ is great, on the other hand, the receiving voltage is low and the reflected power is high.

Accordingly, a map or the like is prepared by obtaining in advance the relation between the receiving voltage and the reflected power, and the position mismatch amount, for each adjusted value of impedance matching box 120 in power feeding facility 100. Then, the map or the like is used to estimate the position mismatch amount δ based on the adjusted value of impedance matching box 120 in power feeding facility 100, the receiving voltage and the reflected power. As was described with reference to FIG. 5, receiving power can be used instead of the receiving voltage.

Referring again to FIG. 7, matching box adjustment unit 530 adjusts the impedance of impedance matching box 250 to match an input impedance of the resonant system to an output impedance of power supply device 110, based on the position mismatch amount δ estimated by position mismatch amount estimation unit 520.

Figure 9:
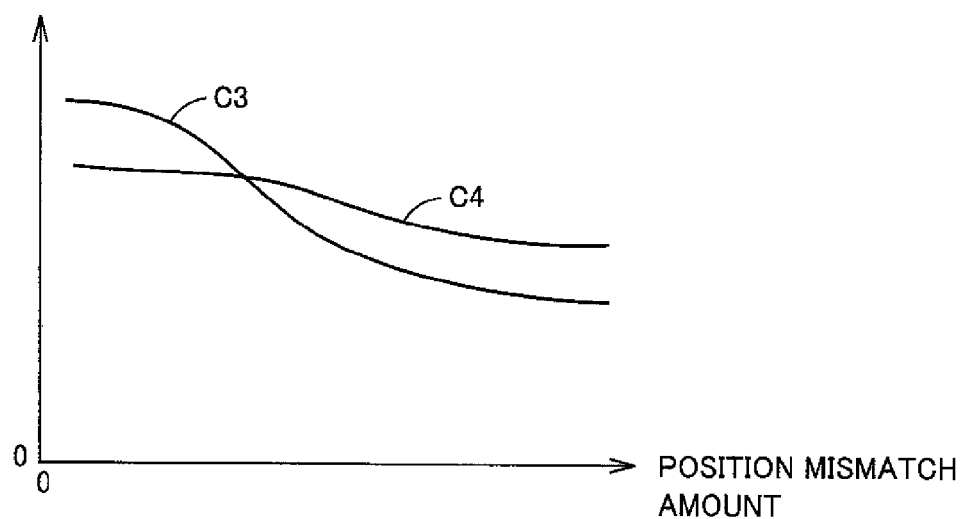
FIG. 9 illustrates an example of relation between the position mismatch amount and an adjusted value of the impedance matching box in the vehicle.

FIG. 9 illustrates an example of relation between the position mismatch amount δ and the adjusted value of impedance matching box 250. Referring to FIG. 9, C3 and C4 represent adjusted values of variable capacitors 122 and 124 of impedance matching box 250 (FIG. 2), respectively. Adjusted values C3 and C4 thus vary with the position mismatch amount δ. Accordingly, a map or the like is prepared by obtaining in advance the relation between the position mismatch amount δ and adjusted values C3 and C4. Then, the map or the like is used to determine adjusted values C3 and C4 based on the position mismatch amount δ estimated based on the receiving voltage and the reflected power.

Figure 10:
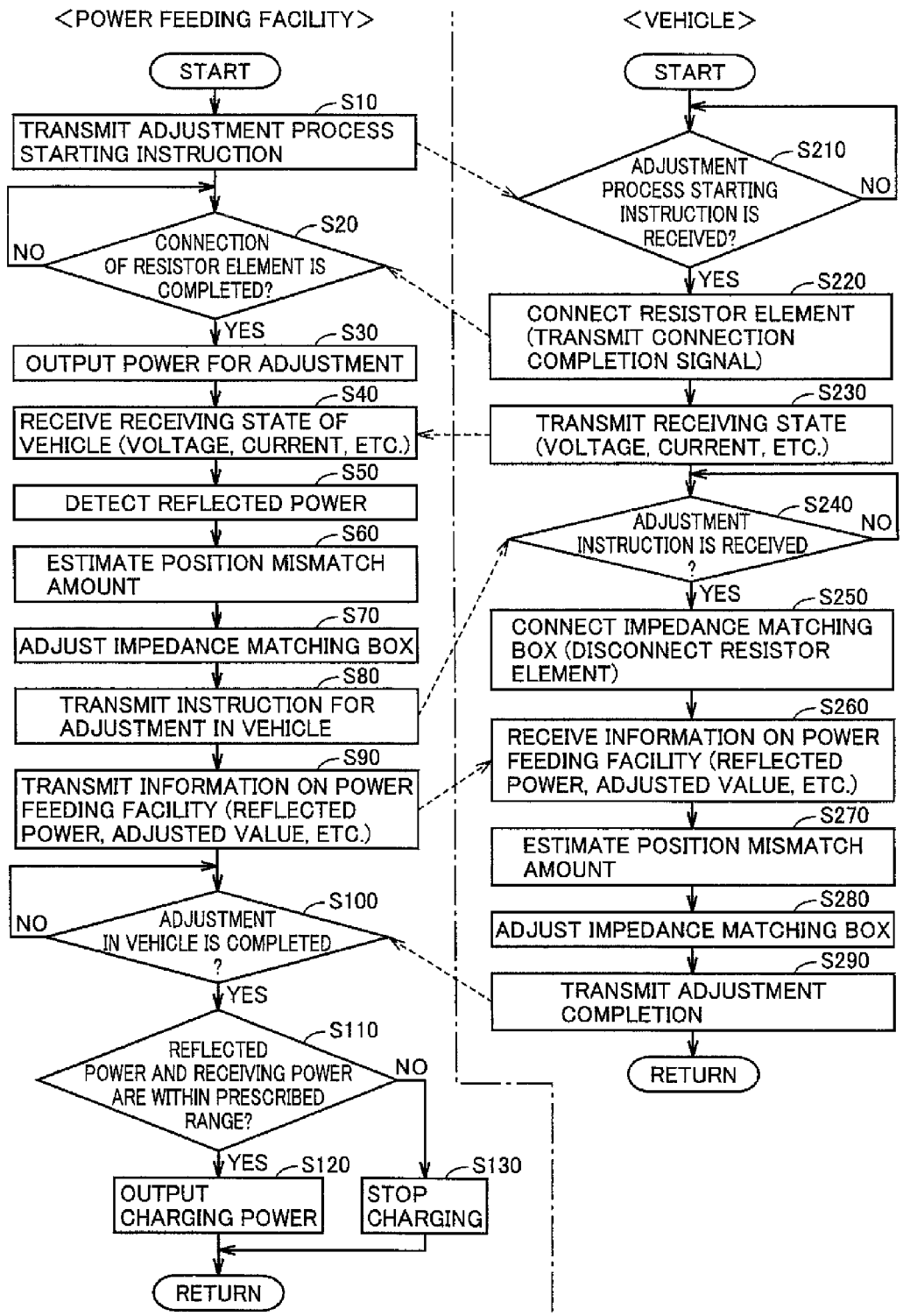
FIG. 10 is a flowchart for illustrating a process flow in the contactless power feeding system.

FIG. 10 is a flowchart for illustrating a process flow in this contactless power feeding system. Referring to FIG. 10, first, a process flow in power feeding facility 100 is described. ECU 160 of power feeding facility 100 transmits an instruction to start the adjustment process to vehicle 200 (step S10). When ECU 160 receives from vehicle 200 a signal indicating the completion of connection of resistor element 246 in vehicle 200 in response to this instruction to start the adjustment process (YES in step S20), ECU 160 controls power supply device 110 to output power for adjustment (step S30). This power for adjustment is prescribed power lower than that during the practical power feeding for charging power storage device 280.

Next, ECU 160 receives a receiving state (receiving voltage, receiving current, receiving power and the like) of vehicle 200 from vehicle 200 (step S40). Then, ECU 160 receives reflected power to power supply device 110 detected by power sensor 115 from power sensor 115 (step S50).

Then, ECU 160 estimates a position mismatch amount δ based on the detected values of a received receiving voltage and detected reflected power, by using the position mismatch amount estimation map prepared in advance (FIG. 5) showing the relation between the receiving voltage of vehicle 200 and the reflected power in power feeding facility 100, and the position mismatch amount (step S60). Then, ECU 160 adjusts impedance matching box 120 based on the position mismatch amount δ estimated in step S60, by using the matching box adjustment map prepared in advance (FIG. 6) showing the relation between the position mismatch amount of secondary self-resonant coil 210 relative to primary self-resonant coil 140 and the adjusted value of impedance matching box 120 (step S70).

When the adjustment of impedance matching box 120 in power feeding facility 100 is completed, ECU 160 transmits an instruction to adjust impedance matching box 250 in vehicle 200 to vehicle 200 (step S80). Then, ECU 160 transmits information on power feeding facility 100 (the detected value of reflected power, the impedance adjusted value and the like) to vehicle 200 (step S90).

Next, ECU 160 determines whether or not the adjustment of impedance matching box 250 in vehicle 200 has been completed (step S100). If it is determined that the adjustment in vehicle 200 has been completed (YES in step S100), ECU 160 determines whether or not the reflected power and the receiving power of vehicle 200 are within a prescribed range (step S110). This determination process is to determine whether or not the magnitudes of the reflected power and the receiving power are appropriate relative to the power (traveling wave power) output from power supply device 110.

If it is determined that the reflected power and the receiving power are within the prescribed range (YES in step S110), ECU 160 controls power supply device 110 to output charging power for charging power storage device 280 (step S120). If it is determined that the reflected power and the receiving power are not within the prescribed range (NO in step S110), on the other hand, ECU 160 stops power supply device 110 to stop charging of power storage device 280 by power feeding facility 100 (step S130).

Next, a process flow in vehicle 200 is described. When ECU 290 of vehicle 200 receives the instruction to start the adjustment process from power feeding facility 100 (YES in step S210), ECU 290 turns relays 242 and 244 of switching device 240 off and on, respectively. Thus, resistor element 246 is electrically connected to the resonant system, and ECU 290 transmits the signal indicating the completion of connection to power feeding facility 100 (step S220). When the power for adjustment is output from power feeding facility 100 in response to this signal indicating the completion of connection, ECU 290 transmits the receiving state of vehicle 200 including the receiving voltage detected by voltage sensor 310 to power feeding facility 100 (step S230).

Then, when ECU 290 receives the instruction to adjust impedance matching box 250 from power feeding facility 100 (YES in step S240), ECU 290 turns relays 242 and 244 on and off, respectively. Thus, impedance matching box 250 is electrically connected to the resonant system and resistor element 246 is disconnected from the resonant system (step S250). Then, ECU 290 receives the information on power feeding facility 100 (the detected value of reflected power, the impedance adjusted value and the like) from power feeding facility 100 (step S260).

Then, ECU 290 estimates the position mismatch amount δ based on the received adjusted value of impedance matching box 120, the detected value of reflected power and the detected receiving voltage, by using the position mismatch amount estimation map prepared in advance (FIG. 8) (step S270). As described above, the position mismatch amount estimation map is prepared in advance for each adjusted value of impedance matching box 120 of power feeding facility 100.

Then, ECU 290 adjusts impedance matching box 250 based on the position mismatch amount δ estimated in step S270, by using the matching box adjustment map prepared in advance (FIG. 9) (step S280). When the adjustment of impedance matching box 250 is completed, ECU 290 transmits the signal indicating the completion of adjustment to vehicle 200 (step S290).

As such, in the first embodiment, power feeding facility 100 and vehicle 200 include impedance matching boxes 120 and 250, respectively. Thus, a wide range of impedance adjustment is obtained as compared to when an impedance matching box is provided in only one of power feeding facility 100 and vehicle 200. In addition, impedance matching box 120 in power feeding facility 100 is adjusted prior to adjustment of impedance matching box 250 in vehicle 200. After the adjustment of impedance matching box 120, impedance matching box 250 in vehicle 200 is adjusted. Thus, the reflected power is suppressed in power feeding facility 100. According to the first embodiment, therefore, the wide range of impedance adjustment can improve power transmission efficiency, and the suppression of reflected power in power feeding facility 100 can prevent damage to power supply device 110.

Moreover, in the first embodiment, by exchanging information between power feeding facility 100 and vehicle 200, the adjustment of impedance matching box 120 of power feeding facility 100 is performed by ECU 160 of power feeding facility 100 and the adjustment of impedance matching box 250 of vehicle 200 is performed by ECU 290 of vehicle 200. According to the first embodiment, therefore, the impedance adjustment has high responsivity, thus allowing the adjustment to be made in a short time.

Second Embodiment

In the first embodiment, the position mismatch amount δ is estimated based on the receiving voltage and the reflected power by using the map in vehicle 200 as well. Alternatively, the position mismatch amount δ estimated by ECU 160 of power feeding facility 100 may be transmitted to vehicle 200 and used in vehicle 200.

Figure 11:
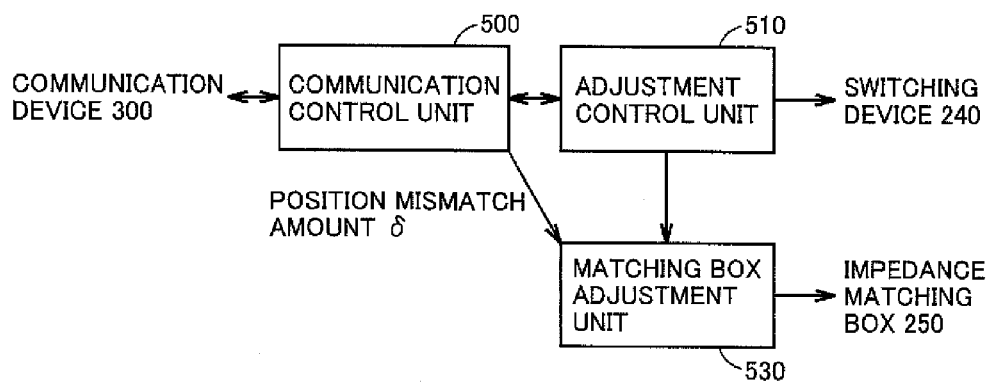
FIG. 11 is a functional block diagram of an ECU in a vehicle according to a second embodiment.

FIG. 11 is a functional block diagram of an ECU in vehicle 200 according to a second embodiment. Referring to FIG. 11, an ECU 290A does not include position mismatch amount estimation unit 520 in the configuration of ECU 290 according to the first embodiment shown in FIG. 7. That is, matching box adjustment unit 530 receives the position mismatch amount δ estimated in power feeding facility 100 and received from power feeding facility 100, via communication control unit 500. Then, matching box adjustment unit 530 adjusts the impedance of impedance matching box 250 to match an input impedance of the resonant system to an output impedance of power supply device 110, based on the received position mismatch amount δ.

The function of ECU 290A is otherwise the same as that of ECU 290 according to the first embodiment shown in FIG. 7.

Figure 12:
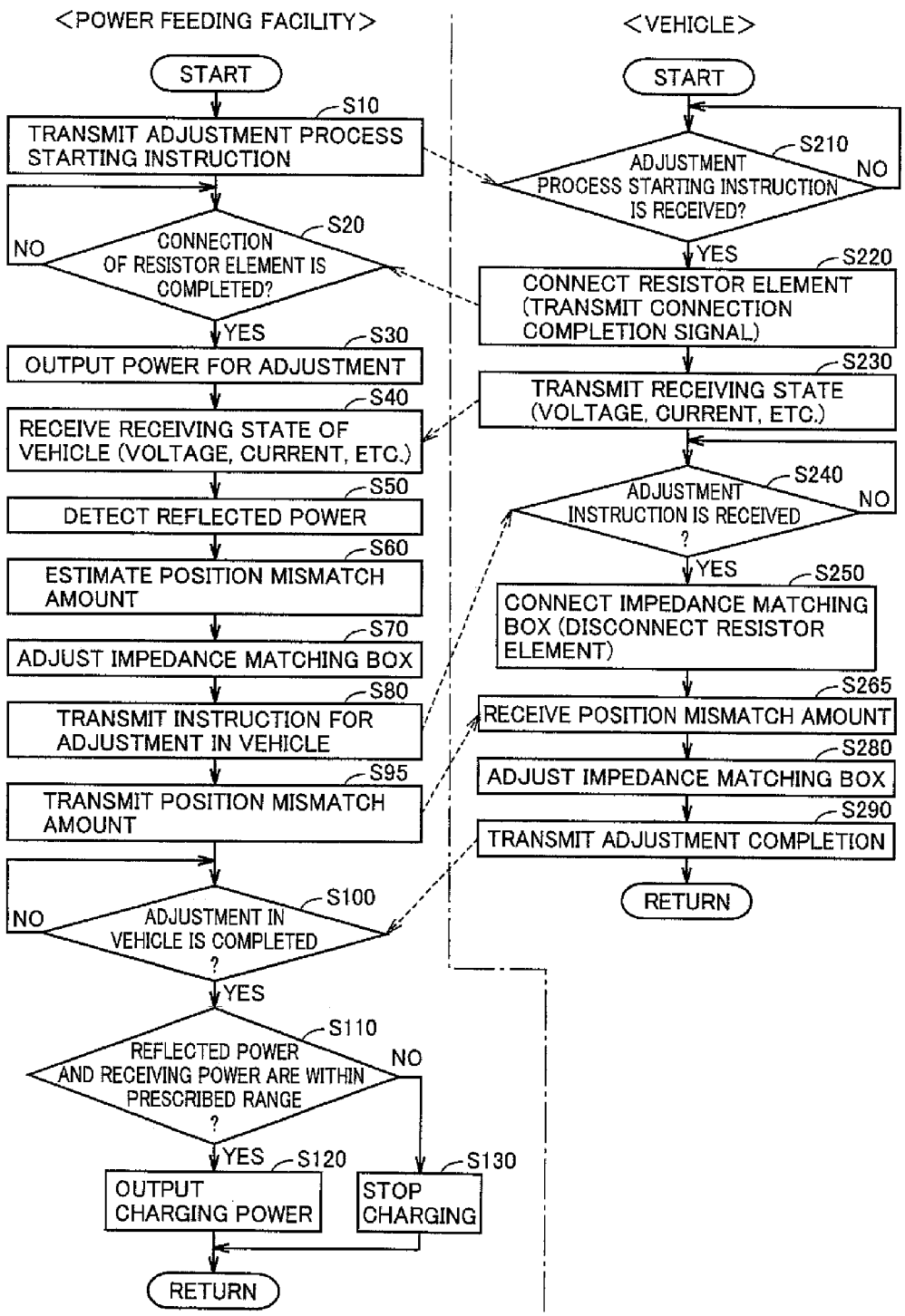
FIG. 12 is a flowchart for illustrating a process flow in a contactless power feeding system according to the second embodiment.

FIG. 12 is a flowchart for illustrating a process flow in the contactless power feeding system according to the second embodiment. Referring to FIG. 12, this flowchart includes a step S95 instead of step S90, and includes a step S265 instead of steps S260 and S270, in the flowchart shown in FIG. 10.

That is, when the instruction to adjust impedance matching box 250 of vehicle 200 is transmitted to vehicle 200 in step S80, ECU 160 of power feeding facility 100 further transmits the position mismatch amount δ estimated in step S60 to vehicle 200 (step S95).

Then, when impedance matching box 250 is electrically connected to the resonant system and resistor element 246 is disconnected from the resonant system in step S250, ECU 290 of vehicle 200 receives the position mismatch amount δ transmitted from power feeding facility 100 (step S265). Then, ECU 290 proceeds to the process in step S280, and adjusts impedance matching box 250 based on the position mismatch amount δ received from power feeding facility 100.

The position mismatch amount δ is estimated in power feeding facility 100 and the estimated value is transmitted to vehicle 200 in the above description. Alternatively, the position mismatch amount δ may be estimated in vehicle 200 and the estimated value may be transmitted to power feeding facility 100 and used for adjustment of impedance matching box 120 in power feeding facility 100.

As described above, in the second embodiment, an operation of estimating the position mismatch amount δ can be eliminated in one of power feeding facility 100 and vehicle 200, thereby reducing the time for the adjustment process.

Third Embodiment

Switching device 240 including resistor element 246 for adjustment is provided between secondary coil 230 and impedance matching box 250 in vehicle 200 in the first and second embodiments. Alternatively, switching device 240 may be provided between rectifier 260 and charger 270.

Figure 13:
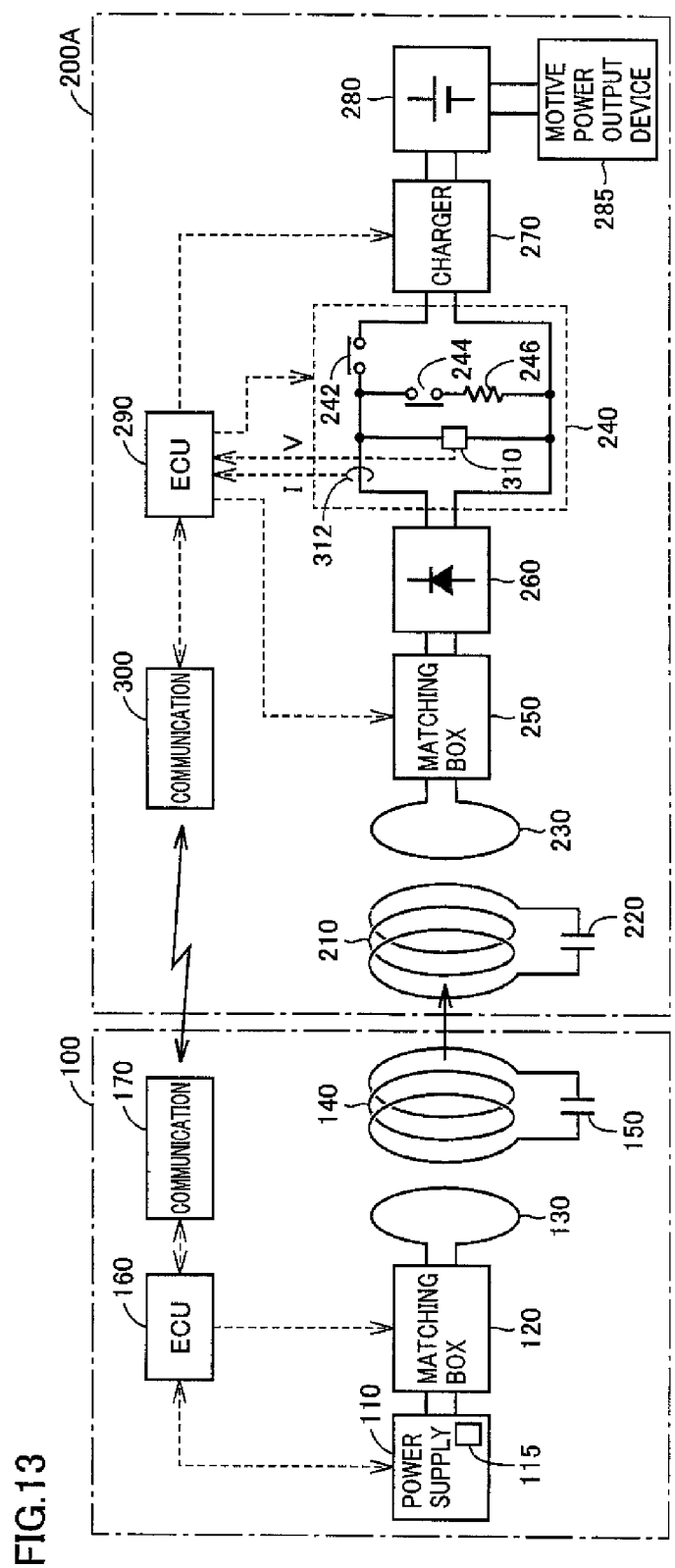
FIG. 13 is an overall configuration diagram of a contactless power feeding system according to a third embodiment.

FIG. 13 is an overall configuration diagram of a contactless power feeding system according to a third embodiment. Referring to FIG. 13, this contactless power feeding system includes a vehicle 200A instead of vehicle 200 in the configuration of the contactless power feeding system according to the first embodiment shown in FIG. 1. In vehicle 200A, switching device 240 is provided between rectifier 260 and charger 270.

Again in the third embodiment, impedance matching box 120 in power feeding facility 100 is adjusted first. After the adjustment of impedance matching box 120, impedance matching box 250 in vehicle 200 is adjusted. In the third embodiment, on the other hand, resistor element 246 is electrically connected to the resonant system by switching device 240 even during the adjustment of impedance matching box 250 in vehicle 200. When the adjustment of impedance matching box 250 is completed, resistor element 246 is disconnected from the resonant system and charger 270 is electrically connected to the resonant system.

The configuration of vehicle 200A is otherwise the same as that of vehicle 200 according to the first embodiment shown in FIG. 1. The aforementioned configuration is also applicable to the second embodiment.

As described above, effects similar to those in the first and second embodiments can be provided in the third embodiment as well.

Although electric power is transmitted by resonance between primary self-resonant coil 140 of power feeding facility 100 and secondary self-resonant coil 210 of vehicle 200 in the aforementioned embodiments, the power transmission unit and the power reception unit may be formed of a pair of high dielectric disks. The high dielectric disks are made of a high dielectric constant material such as $TiO_2$, $BaTi_4O_9$ or $LiTaO_3$.

In the above description, primary coil 130, primary self-resonant coil 140 and capacitor 150 constitute an example of the "power transmission unit" in the present invention. Secondary self-resonant coil 210, capacitor 220 and secondary coil 230 constitute an example of the "power reception unit" in the present invention. Furthermore, power storage device 280 corresponds to an example of the "load" in the present invention.

It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

REFERENCE SIGNS LIST

100 power feeding facility; 110 power supply device; 115 power sensor; 120, 250 impedance matching box; 122, 124 variable capacitor; 126 coil; 130 primary coil; 140 primary self-resonant coil; 150, 220 capacitor; 160, 290, 290A ECU; 170, 300 communication device; 200, 200A vehicle; 230 secondary coil; 240 switching device; 242, 244 relay; 246 resistor element; 260 rectifier; 270 charger; 280 power storage device; 285 motive power output device; 310 voltage sensor; 312 current sensor; 350 load; 400, 500 communication control unit; 410 power control unit; 420, 520 position mismatch amount estimation unit; 430, 530 matching box control unit; 510 adjustment control unit.

The invention claimed is:

1. A contactless power feeding system comprising:
   a power feeding facility; and
   a power receiving apparatus for receiving electric power in a contactless manner from the power feeding facility;
   the power feeding facility including:
      a power supply device for generating electric power having a prescribed frequency;
      a power transmission unit for receiving the power from the power supply device, and resonating with the power receiving apparatus through an electromagnetic field to transmit the power in a contactless manner to the power receiving apparatus;
      a first variable impedance device provided between the power supply device and the power transmission unit;
      a first control device that adjusts the first variable impedance device; and
      a first communication device that transmits information on the power feeding facility and a position mismatch amount to the power receiving apparatus;
   the power receiving apparatus including:
      a power reception unit for resonating with the power transmission unit through the electromagnetic field to receive the power in a contactless manner from the power transmission unit;
      a load for receiving the power received by the power reception unit;
      a second variable impedance device provided between the power reception unit and the load;
      a second control device for adjusting the second variable impedance device; and a second communication device capable of establishing communication with the first communication device, the second communication device transmitting information on the power receiving apparatus to the power feeding facility;

the first control device adjusting the first variable impedance device prior to adjustment of the second variable impedance device in the power receiving apparatus, the first control device adjusting the first variable impedance device by using the information on the power receiving apparatus received by the first communication device, the first control device further adjusting the first variable impedance device based on the position mismatch amount, which is estimated based on the information on the power receiving apparatus and corresponds to a position mismatch of the power transmission unit relative to the power reception unit, the second control device adjusting the second variable impedance device after the adjustment of the first variable impedance device by the first control device, the second control device adjusting the second variable impedance device by using the information on the power feeding facility received by the second communication device and the position mismatch amount which is received by the second communication device.

2. The contactless power feeding system according to claim 1, wherein the power transmission unit includes a primary self-resonant coil for receiving the power from the power supply device to generate the electromagnetic field, and the power reception unit includes a secondary self-resonant coil for resonating with the primary self-resonant coil through the electromagnetic field to receive the power from the primary self-resonant coil.

3. The contactless power feeding system according to claim 1, wherein the power transmission unit includes:
  a primary coil for receiving the power from the power supply device; and
  a primary self-resonant coil for receiving the power from the primary coil by electromagnetic induction to generate the electromagnetic field; and the power reception unit includes:
  a secondary self-resonant coil for resonating with the primary self-resonant coil through the electromagnetic field to receive the power from the primary self-resonant coil; and
  a secondary coil for extracting the power received by the secondary self-resonant coil by electromagnetic induction to output the power.

4. The contactless power feeding system according to claim 1, wherein the power receiving apparatus is mounted on a vehicle.

5. A contactless power feeding system comprising:
a power feeding facility; and
a power receiving apparatus for receiving electric power in a contactless manner from the power feeding facility;
the power feeding facility including:
  a power supply device for generating electric power having a prescribed frequency;
  a power transmission unit for receiving the power from the power supply device, and resonating with the power receiving apparatus through an electromagnetic field to transmit the power in a contactless manner to the power receiving apparatus;
  a first variable impedance device provided between the power supply device and the power transmission unit; and
  a first control device for adjusting the first variable impedance device;
the power receiving apparatus including:
  a power reception unit for resonating with the power transmission unit through the electromagnetic field to receive the power in a contactless manner from the power transmission unit;
  a load for receiving the power received by the power reception unit;
  a second variable impedance device provided between the power reception unit and the load;
  a second control device for adjusting the second variable impedance device;
  a resistor element electrically connected between a pair of power lines provided between the power reception unit and the second variable impedance device during the adjustment of the first and second variable impedance devices; and
  a switching device for electrically connecting the resistor element between the pair of power lines and electrically disconnecting the second variable impedance device from the power reception unit during the adjustment of the first and second variable impedance devices,
  the first control device adjusting the first variable impedance device prior to adjustment of the second variable impedance device in the power receiving apparatus, and
  the second control device adjusting the second variable impedance device after the adjustment of the first variable impedance device by the first control device.

6. A contactless power feeding system comprising:
a power feeding facility; and
a power receiving apparatus for receiving electric power in a contactless manner from the power feeding facility;
the power feeding facility including:
  a power supply device for generating electric power having a prescribed frequency;
  a power transmission unit for receiving the power from the power supply device, and resonating with the power receiving apparatus through an electromagnetic field to transmit the power in a contactless manner to the power receiving apparatus;
  a first variable impedance device provided between the power supply device and the power transmission unit; and
  a first control device for adjusting the first variable impedance device,
the power receiving apparatus including:
  a power reception unit for resonating with the power transmission unit through the electromagnetic field to receive the power in a contactless manner from the power transmission unit;
  a load for receiving the power received by the power reception unit;
  a second variable impedance device provided between the power reception unit and the load;
  a second control device for adjusting the second variable impedance device;
  a rectifier provided between the second variable impedance device and the load, for rectifying the power received by the power reception unit;

a resistor element electrically connected between a pair of power lines provided between the rectifier and the load during the adjustment of the first and second variable impedance devices; and a switching device for electrically connecting the resistor element between the pair of power lines and electrically disconnecting the load from the rectifier during the adjustment of the first and second variable impedance devices;

the first control device adjusting the first variable impedance device prior to adjustment of the second variable impedance device in the power receiving apparatus, and the second control device adjusting the second variable impedance device after the adjustment of the first variable impedance device by the first control device.

7. A vehicle capable of receiving electric power in a contactless manner from a power feeding facility, the power feeding facility including a first variable impedance device provided between a power supply device and a power transmission unit, the vehicle comprising:

a power reception unit for resonating with the power transmission unit through an electromagnetic field to receive the power in a contactless manner from the power transmission unit;

a load for receiving the power received by the power reception unit;

a second variable impedance device provided between the power reception unit and the load;

a control device for adjusting the second variable impedance device, the control device adjusting the second variable impedance device after adjustment of the first variable impedance device in the power feeding facility;

a resistor element electrically connected between a pair of power lines provided between the power reception unit and the second variable impedance device during the adjustment of the first and second variable impedance devices; and a switching device for electrically connecting the resistor element between the pair of power lines and electrically disconnecting the second variable impedance device from the power reception unit during the adjustment of the first and second variable impedance devices.

8. A vehicle capable of receiving electric power in a contactless manner from a power feeding facility, the power feeding facility including a first variable impedance device provided between a power supply device and a power transmission unit, the vehicle comprising:

a power reception unit for resonating with the power transmission unit through an electromagnetic field to receive the power in a contactless manner from the power transmission unit;

a load for receiving the power received by the power reception unit;

a second variable impedance device provided between the power reception unit and the load;

a control device for adjusting the second variable impedance device, the control device adjusting the second variable impedance device after adjustment of the first variable impedance device in the power feeding facility;

a rectifier provided between the second variable impedance device and the load, for rectifying the power received by the power reception unit;

a resistor element electrically connected between a pair of power lines provided between the rectifier and the load during the adjustment of the first and second variable impedance devices; and a switching device for electrically connecting the resistor element between the pair of power lines and electrically disconnecting the load from the rectifier during the adjustment of the first and second variable impedance devices.

9. A method of controlling a contactless power feeding system in which electric power is fed in a contactless manner from a power feeding facility to a power receiving apparatus, the power feeding facility including:
a power supply device for generating electric power having a prescribed frequency;
a power transmission unit for receiving the power from the power supply device, and resonating with the power receiving apparatus through an electromagnetic field to transmit the power in a contactless manner to the power receiving apparatus;
a first variable impedance device provided between the power supply device and the power transmission unit; and the power receiving apparatus including:
a power reception unit for resonating with the power transmission unit through the electromagnetic field to receive the power in a contactless manner from the power transmission unit;
a load for receiving the power received by the power reception unit; and
a second variable impedance device provided between the power reception unit and the load;

the method comprising the steps of:
transmitting information on the power receiving apparatus to the power feeding facility;
estimating a position mismatch amount of the power reception unit relative to the power transmission unit based on the transmitted information on the power receiving apparatus;
adjusting the first variable impedance device prior to adjusting the second variable impedance device by using the transmitted information on the power receiving apparatus, and based on the estimated position mismatch amount;
transmitting the estimated position mismatch amount and information on the power feeding facility to the power receiving apparatus; and
adjusting the second variable impedance device after adjusting the first variable impedance device by using the transmitted information on the power feeding facility and the estimated position mismatch amount.

* * * * *